(12) United States Patent
Chang

(10) Patent No.: US 7,924,374 B2
(45) Date of Patent: Apr. 12, 2011

(54) COLOR FILTERS FOR DISPLAY DEVICES

(76) Inventor: Chih-Neng Chang, Taipei (TW)

( * ) Notice: Subject to any disclaimer, the term of this patent is extended or adjusted under 35 U.S.C. 154(b) by 89 days.

(21) Appl. No.: 12/054,439

(22) Filed: Mar. 25, 2008

(65) Prior Publication Data

US 2009/0244448 A1    Oct. 1, 2009

(51) Int. Cl.
*G02F 1/1335* (2006.01)
(52) U.S. Cl. .......................... 349/108; 349/106; 349/107
(58) Field of Classification Search ........... 349/106–108
See application file for complete search history.

(56) References Cited

U.S. PATENT DOCUMENTS

| | | | | |
|---|---|---|---|---|
| 6,078,421 | A * | 6/2000 | Davey et al. | 359/237 |
| 6,774,963 | B1 * | 8/2004 | Nakao et al. | 349/104 |
| 7,456,915 | B2 * | 11/2008 | Lazarev et al. | 349/62 |

* cited by examiner

*Primary Examiner* — David Nelms
*Assistant Examiner* — Phu Vu

(57) ABSTRACT

A display device including a light source and a pixelized color filter element is provided. The pixelized color filter element includes a plurality of first pixelized filters, a plurality of second pixelized filters and a plurality of third pixelized filters. The pixelized color filter element has a total reflectance higher than 5% in a wavelength range of 400 to 700 nm. At least one of the first pixelized filters, second pixelized filters and third pixelized filters includes a first layer and a second layer. The first material layer has a transmittance higher than 50% in a wavelength range of 400 to 700 nm. The second material layer has a transmittance higher than 50% in a wavelength range of 400 to 700 nm.

20 Claims, 6 Drawing Sheets

COLOR FILTERS FOR DISPLAY DEVICES

FIELD OF THE INVENTION

The present invention relates to a color filter for a display device, and more particularly to a color filter for a liquid crystal display device.

BACKGROUND OF THE INVENTION

Recently the technologies of the liquid crystal displays have been advanced and improved quickly. Moreover, the production cost of the liquid crystal displays is continuously reduced. Therefore, the traditional cathode ray tubes (CRT) are almost completely replaced by the liquid crystal displays (LCD) in the market of the monitors. As the technologies of LCD are being improved greatly, the market of LCD TV is growing quite fast.

Although the LCD has plenty of advantage, e.g. the extremely thin in the dimension, large screen size, high resolution, etc, LCD still has a lot of performances required to be improved. Currently the light utilization rate of LCD is still very low, about less than 10%. That is, less than 10% of the light generated by the back light source finally reaches our eyes out of the LCD screen due to the technical characteristics of LCD. The reasons are explained briefly below.

Generally the white light is composed of three primary color lights, i.e. red, green and blue lights. Almost all the color light can be generated by mixing these primary color lights at the relatively various amounts. Currently almost all the color LCD utilizes the color filter to generate three primary color lights. However when the white light from the back light source passes through this color filter, only roughly one third (practically 30%) of light comes out, and the rest two third of light was absorbed by the red, green or blue pigment (or dye). On the other hand, polarizer inevitably used in LCD can only allow about 45% (50% in theoretically perfect condition) of light to pass through. Totally less than 10% of light at most can come out of the LCD screen after the light from the back light source passes the color filter and two polarizers.

Recently the issues of the environmental conservation and energy saving become more and more serious on the earth. It is extremely important to solve the problem of low light utilization rate in LCD caused by the color filter and the polarizer. It is noted that the color filter is the component with the lowest light utilization rate, about 30%, in LCD. Assuming, when the light utilization rate of the color filter is increased from 30% to 60%, then the total utilization rate of LCD will be increased from about 10% up to 20%, so the power consumption will be tremendously reduced to one half, 50%, of the original one. That is, a small amount in the improvement on the light utilization rate of the color filter will generate a significant amount in the total power saving.

In order to solve the above-mentioned problems, the new concept and the solution method are proposed in the present invention to raise the light utilization rate in LCD or other display devices. The present invention is described below.

SUMMARY OF THE INVENTION

The present invention provides a pixelized color filter element for a display device to greatly improve the light utilization rate by the light recycling.

In accordance with one aspect of the present invention, a display device is provided. The display device includes a light source and a pixelized color filter element. The pixelized color filter element includes a plurality of first pixelized filters, a plurality of second pixelized filters and a plurality of third pixelized filters. The pixelized color filter element has a total reflectance higher than 5% in a wavelength range of 400 to 700 nm. At least one of the first pixelized filters, second pixelized filters and third pixelized filters includes a first layer and a second layer. The first material layer has a total transmittance higher than 50% in a wavelength range of 400 to 700 nm. The second material layer has a transmittance higher than 50% in a wavelength range of 400 to 700 nm.

Preferably, the display device is a liquid crystal display device.

In accordance with a further aspect of the present invention, a pixelized color filter element for a display device includes a plurality of first pixelized filters, a plurality of second pixelized filters and a plurality of third pixelized filters. The pixelized color filter element has a total reflectance higher than 5% in a wavelength range of 400 to 700 nm. At least one of the first pixelized filters, second pixelized filters and third pixelized filters includes a first layer and a second layer. The first material layer has a total transmittance higher than 50% in a wavelength range of 400 to 700 nm. The second material layer has a total transmittance higher than 50% in a wavelength range of 400 to 700 nm.

Preferably, the first pixelized filters transmit a red light, the second pixelized filters transmit a green light, and the third pixelized filters transmit a blue light.

Preferably, the first pixelized filters reflect a cyan light, the second pixelized filters reflect a magenta light, and the third pixelized filters reflect a yellow light.

Preferably, each of the first pixelized filters is one of an edge interference filter and a band-pass interference filter.

Preferably, each of the second pixelized filters is one of an edge interference filter and a band-pass interference filter.

Preferably, each of the third pixelized filters is one of an edge interference filter and a band-pass interference filter.

Preferably, at least one of the first pixelized filters, the second pixelized filters and the third pixelized filters further includes a plurality of first material layers and a plurality of second material layers, where at least one of the plurality of first material layers has total transmittance higher than 50% in a wavelength range of 400 to 700 nm, at least one of the plurality of second material layers has a total transmittance higher than 50% in a wavelength range of 400 to 700 nm, and the first and second material layers are alternately configured.

Preferably, the pixelized color filter element is made by one of a printing method and a coating method.

Preferably, the pixelized color filter element is made by an ink jet printing method.

Preferably, the materials of the first and second material layers are selected from a group consisting of $SiO_2$, $SiO$, $Si_2O_3$, $Al_2O_3$, $BeO$, $MgO$, $CeF_3$, $LiF$, $NaF$, $MgF_2$, $CaF_2$, $TiO_2$, $Ta_2O_5$, $ZrO_2$, $HfO_2$, $Sb_2O_3$, $Y_2O_3$, $CeO_2$, $PbCl_2$ and $ZnS$.

Preferably, the first and second material layers are made of different materials.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Embodiment

Figure 1:
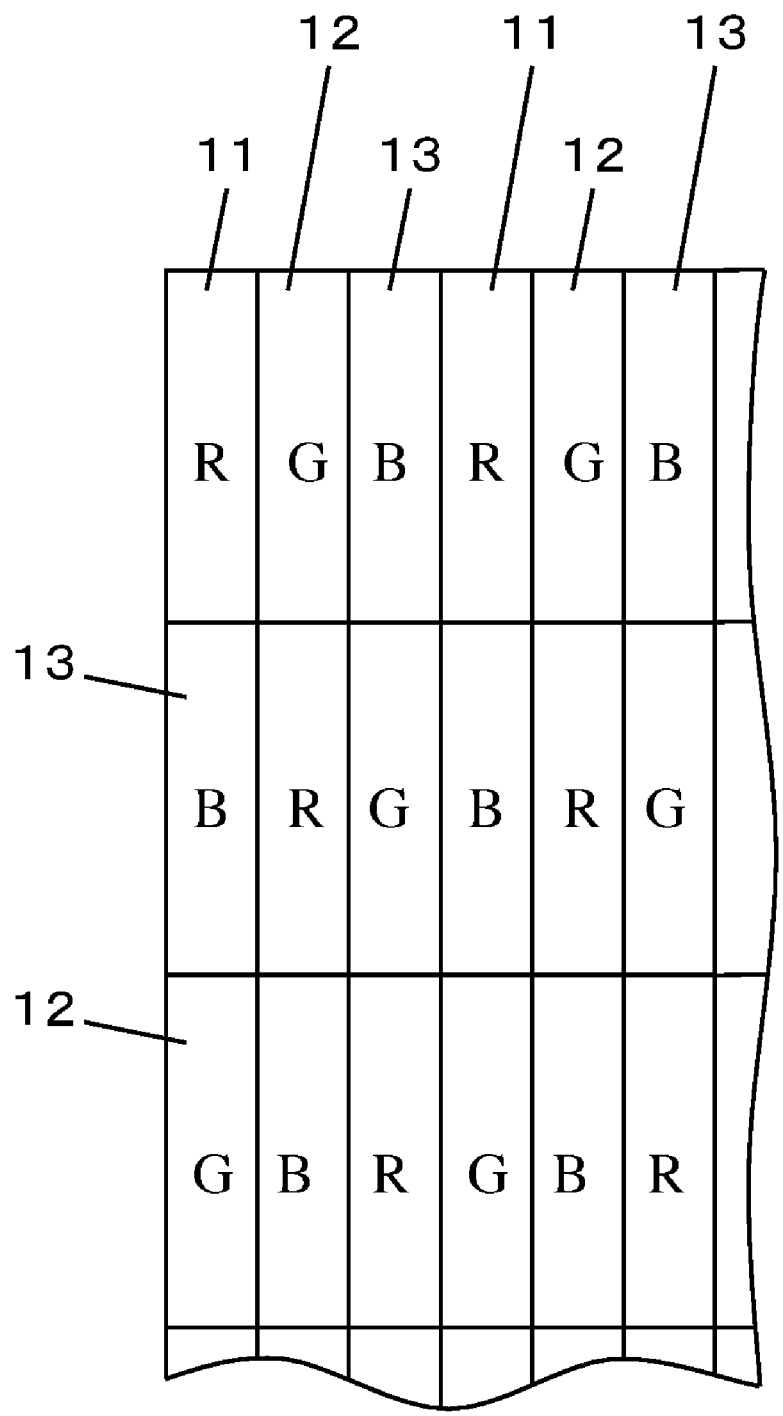
FIG. 1 is a schematic diagram showing the pixelized color filter element according to the first embodiment of the present invention.

Please refer to FIG. 1, which is schematic diagram showing the pixelized color filter element 10 according to the first embodiment of the present invention. The pixelized color filter element 10 includes a plurality of first pixelized filters 11 marked "R", a plurality of second pixelized filters 12 marked "G" and a plurality of third pixelized filters 13 marked "B".

The first pixelized filters 11 will allow the red light to pass and the cyan light, i.e. the complementary color light of the red light, to reflect, when the white light from the back light source passes the first pixelized filters 11 of the pixelized color filter element 10. The second pixelized filters 12 will allow the green light to pass and the magenta light, i.e. the complementary color light of the green light, to reflect, when the white light from the back light source passes the second pixelized filters 12 of the pixelized color filter element 10. The third pixelized filters 13 will allow the blue light to pass and the yellow light, i.e. the complementary color light of the blue light, to reflect, when the white light from the back light source passes the third pixelized filters 13 of the pixelized color filter element 10.

Figure 2:
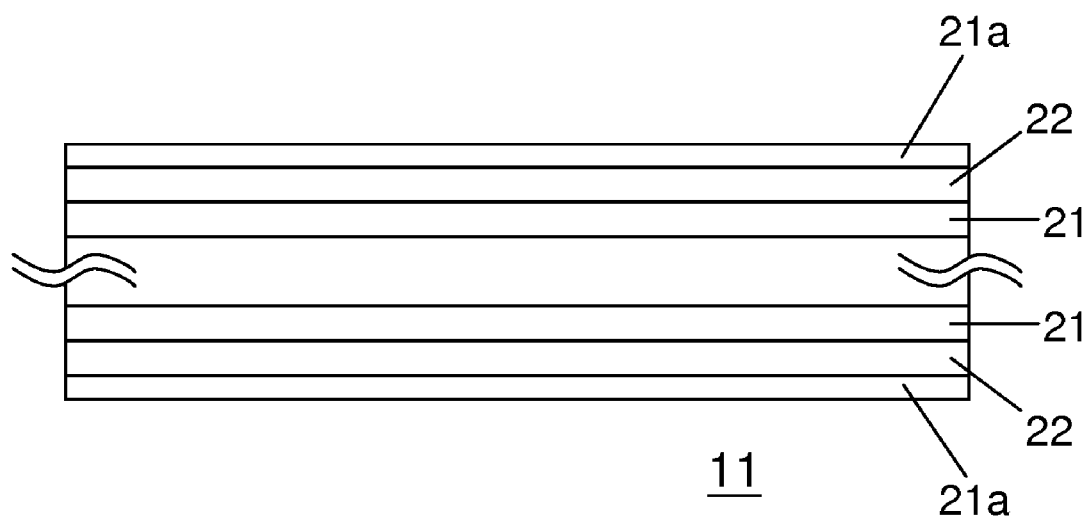
FIG. 2 is a schematic diagram showing sectional view of the first pixelized filter according to the first embodiment of the present invention.

Please refer to the FIG. 2, which is a schematic diagram showing sectional view of the first pixelized filter 11 according to the first embodiment of the present invention. The first pixelized filter 11 includes multiple layers with alternating the first material layer 21 (or 21a) and the second material layers 22. The material of the first material layer 21 (or 21a) is a transparent material, e.g. $TiO_2$, and the material of the second material layer 22 is another transparent material, e.g. $SiO_2$, instead of the red pigment used in the current technique.

The first pixelized filter 11 is designed as an edge interference filter or a band-pass interference filter made of multi-layer transparent materials, e.g. $SiO_2$ and $TiO_2$. When the first pixelized filter 11 is designed as a longwave-pass edge interference filter, the first pixelized filter 11 can have the multi-layer structure of $((H/2)L(H/2))_n$, where the H layer is the first material layer 21 with the quarter-wave optical thickness at the wavelength of 610 nm, and L layer is the second material layer 22 with quarter-wave optical thickness at the wavelength of 610 nm, the H/2 layer has the one half optical thickness of the H layer. The n value outside the parenthesis means the repeating time of the structure inside the parenthesis, and is a natural number, e.g. 5. For instance, when n value is 5, then the structure of $((H/2)L(H/2))_5$ is equal to the that of (H/2)LHLHLHLHL(H/2). When n value is 3, then the structure of $((H/2)L(H/2))_3$ is equal to the that of (H/2)LHLHL(H/2). The optical thickness is defined as the product of the refractive index multiplied by the physical thickness.

For example, the H layer has quarter-wave optical thickness at the wavelength of 610 nm, i.e. 152.5 nm (610/4=152.5). The material of the H layer, first material layer 21, is a high refractive index material, e.g. $TiO_2$, with the refractive index of 2.2. Thus the physical thickness of the H layer is 69.3 nm (152.5/2.2=69.3), and physical thickness of the H/2 layer, first material layer 21a, is 34.7 nm (69.3/2=34.7). On the other hand, the material of the L layer, second material layer 22, is a low refractive index material, e.g. $SiO_2$, with the refractive index of 1.45. So the physical thickness of the L layer is 105 nm (152.5/1.45=105).

Figure 3A:
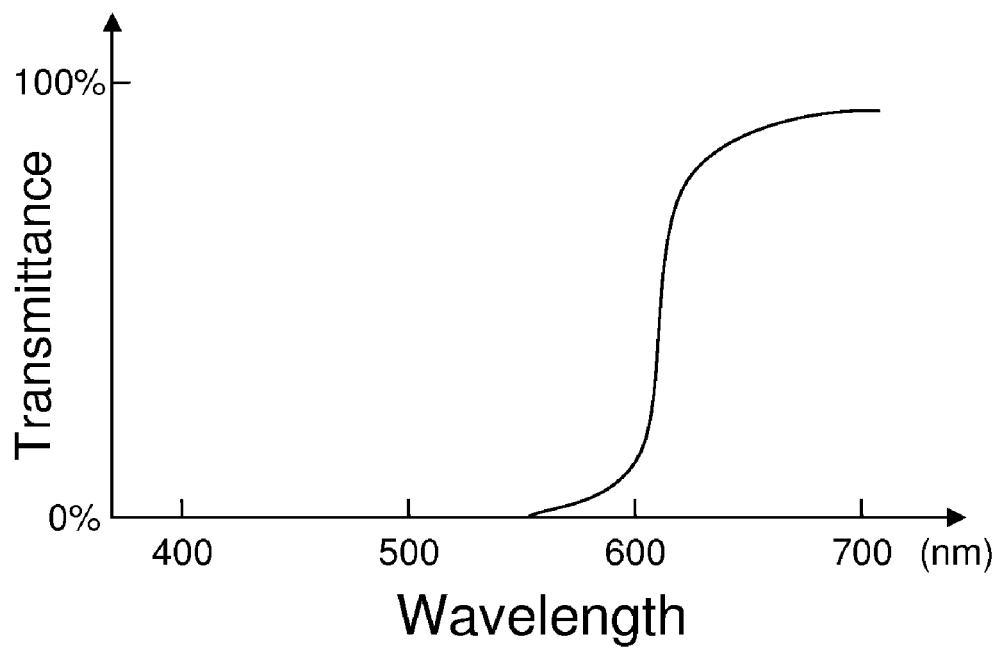
FIGS. 3A and 3B are diagrams showing the transmittance and reflectance spectra of the first pixelized filter according to the first embodiment of the present invention.
Figure 3B:
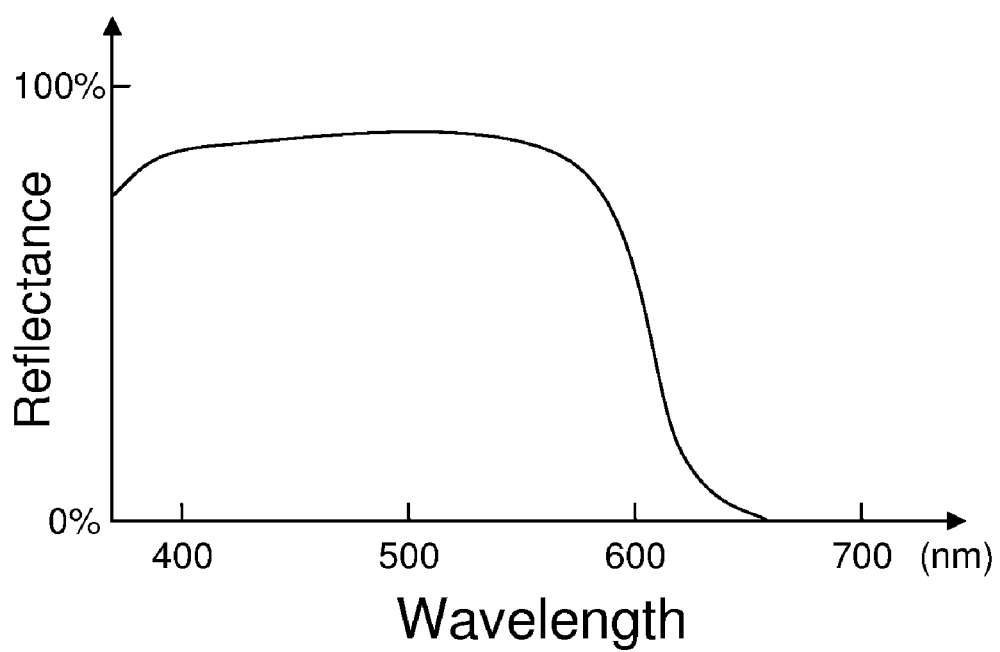

Please refer to the FIGS. 3A and 3B, which are diagrams showing the transmittance and reflectance spectra of the first pixelized filter 11 according to the first embodiment of the present invention. The first pixelized filter 11 has the cut-off wavelength around 610 nm as a longwave-pass edge interference filter, and is able to transmit the red light and to reflect the cyan light, i.e. the complementary color light of the red light. The larger the n value, the sharper the edge of cut-off wavelength of the first pixelized filter 11, and the purer the color light.

The third pixelized filter 13 can be designed by the same method of the optical interference as the first pixelized filter 11, but as a shortwave-pass edge interference filter, instead of longwave-pass edge interference filter for the first pixelized filter 11. The third pixelized filter 13 can also be designed as a band-pass filter. When The third pixelized filter 13 is designed as shortwave-pass edge interference filter, the third pixelized filter 13 can have the structure of the multi-layer structure of $((L'/2)H'(L'/2))$, where the H' layer is the first material layer with the quarter-wave optical thickness at the wavelength of 470 nm, and L' layer is the second material layer with quarter-wave optical thickness at the wavelength of 470 nm, the L'/2 layer has the one half optical thickness of the L' layer. The n value outside the parenthesis means the repeating time of the structure inside the parenthesis, and is a natural number, e.g. 5. For instance, when n value is 5, then the structure of $((L'/2)H'(L'/2))_5$ is equal to the that of (L'/2)H'L'H'L'H'L'H'L'H'(L'/2).

For example, for the third pixelized filter 13, the H' layer has quarter-wave optical thickness at the wavelength of 470 nm, i.e. 117.5 nm (470/4=117.5). The material of the H' layer, first material layer, is a high refractive index material, e.g. $TiO_2$, with the refractive index of 2.2. The physical thickness of the H' layer is 53.4 nm (117.5/2.2=53.4). On the other hand, the material of the L' layer, second material layer, is a low refractive index material, e.g. $SiO_2$, with the refractive index of 1.45. So the physical thickness of the L' layer is 81 nm (117.5/1.45=81), and physical thickness of the L'/2 layer is 40.5 nm (81/2=40.5).

Figure 4A:
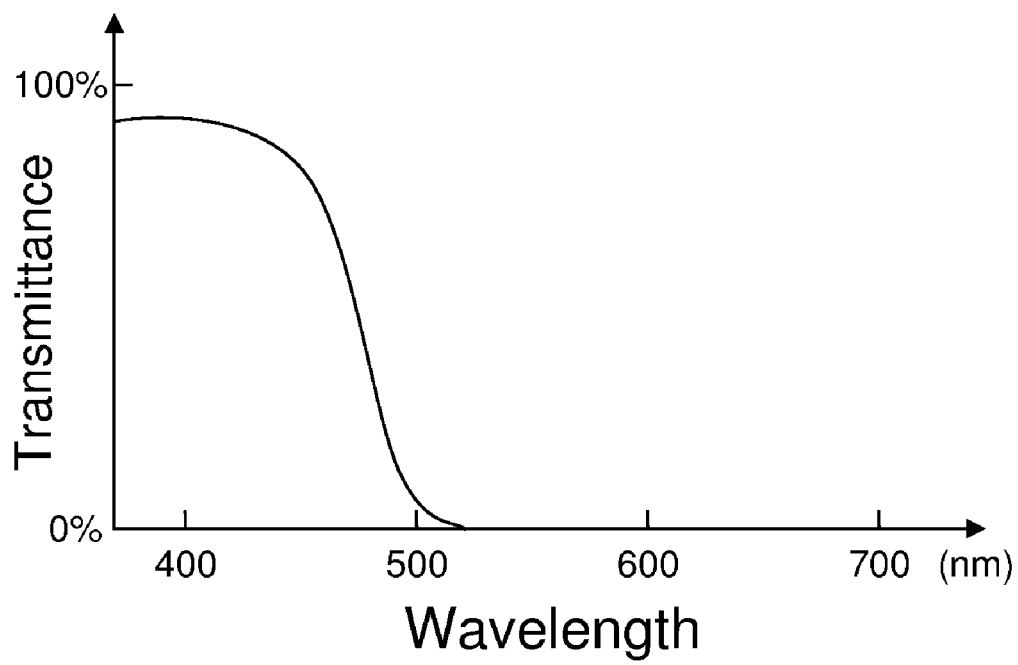
FIGS. 4A and 4B are diagrams showing the transmittance and reflectance spectra of the third pixelized filter according to the first embodiment of the present invention.
Figure 4B:
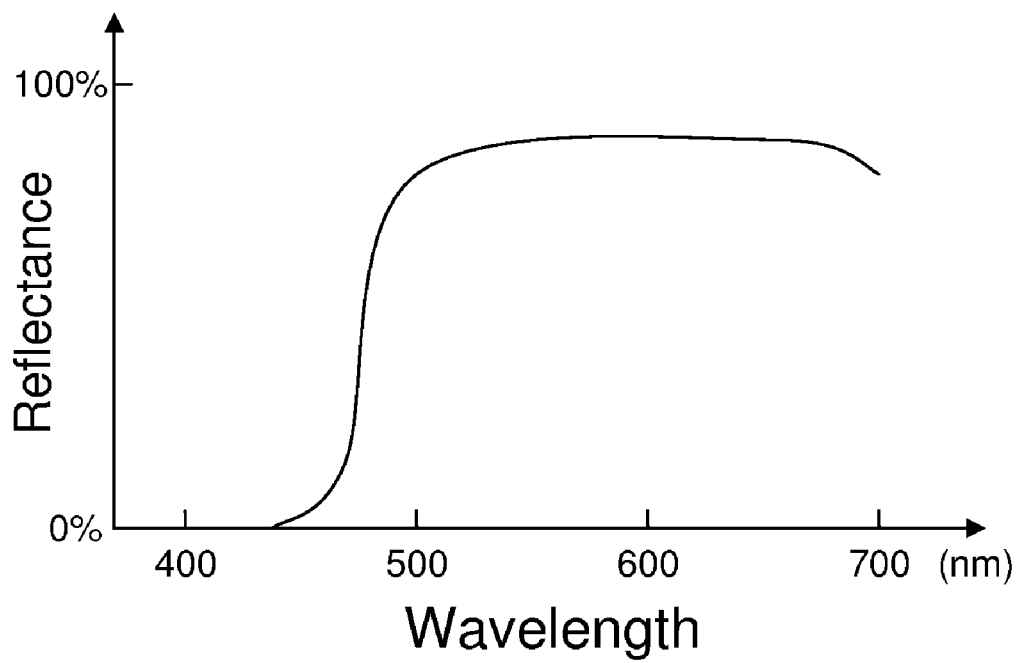

Please refer to the FIGS. 4A and 4B, which are diagrams showing the transmittance and reflectance spectra of the third pixelized filter 13 according to the first embodiment of the present invention. The third pixelized filter 13 has the cut-off wavelength around 470 nm as a short-pass edge interference filter, and is able to transmit the blue light and to reflect the yellow light, i.e. the complementary color light of the blue light.

The second pixelized filter 12 can be designed by the method of the optical interference as well, by combining two set of multi-layers, one set for longwave-pass interference filter with the cut-off wavelength around 460 nm and the other set for the shortwave-pass interference filter with the cut-off wavelength around 590 nm. Eventually, the second pixelized filter 12 works as a band-pass filter.

Figure 5A:
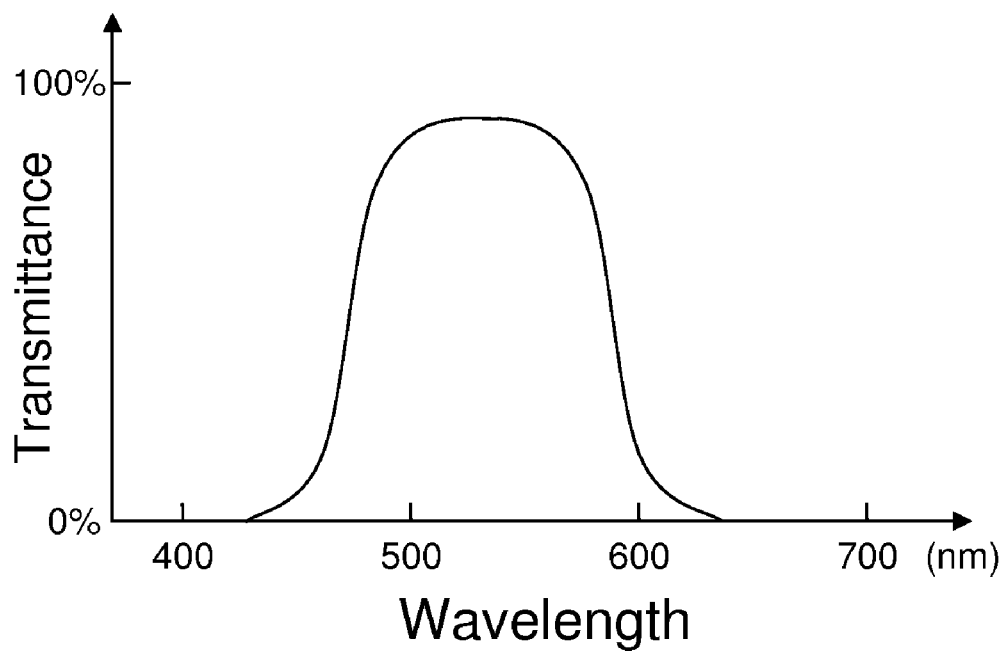
FIGS. 5A and 5B are diagrams showing the transmittance and reflectance spectra of the second pixelized filter according to the first embodiment of the present invention.
Figure 5B:
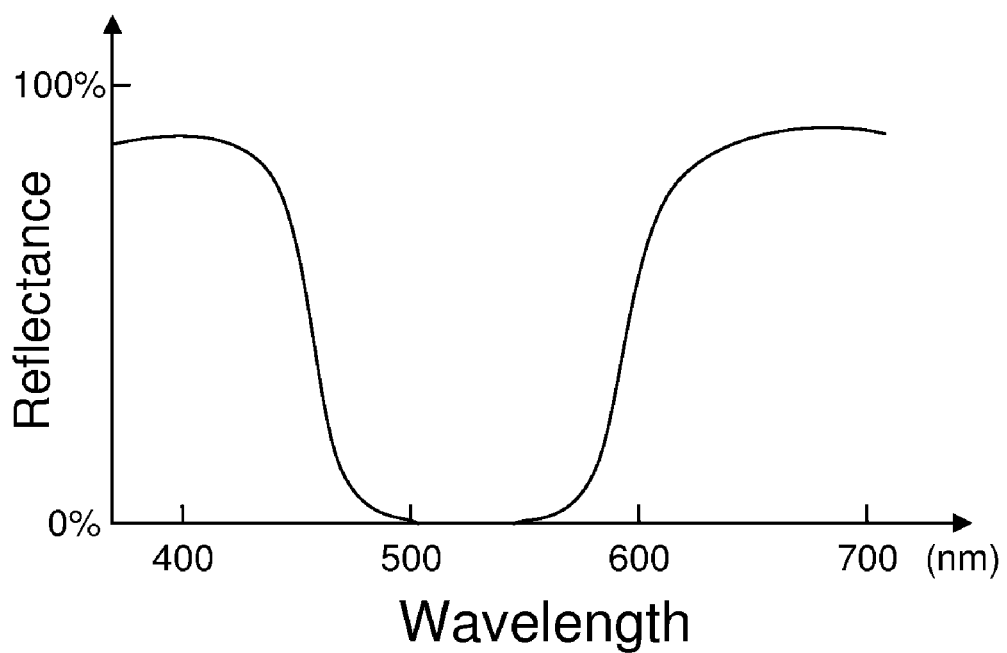

Please refer to the FIGS. 5A and 5B, which are diagrams showing the transmittance and reflectance spectra of the second pixelized filter 12 according to the first embodiment of the present invention. The second pixelized filter 12 has one cut-off wavelength around 470 nm and the other cut-off wavelength around 590 nm as band-pass interference filter, and is able to transmit the green light and to reflect the magenta light, i.e. the complementary color light of the green light.

The materials of the first and second material layers for the first, second and third pixelized filters can be chosen from $SiO_2$, $SiO$, $Si_2O_3$, $Al_2O_3$, $BeO$, $MgO$, $CeF_3$, $LiF$, $NaF$, $MgF_2$, $CaF_2$, $TiO_2$, $Ta_2O_5$, $ZrO_2$, $HfO_2$, $Sb_2O_3$, $Y_2O_3$, $CeO_2$, $PbCl_2$, $ZnS$, etc. The criteria for the material selection are the characteristics of high transparency (e.g. transmittance higher than 50%, preferably higher than 70%, most preferably higher than 85%) and low absorption in visible light, i.e. in wavelength range of 400 to 700 nm. For the above optical design for the longwave-pass and shortwave-pass filters, the greater in the difference of the refractive index between the first and second material layers, the sharper in the edges of the longwave-pass and shortwave-pass edge filters, and the purer in the color light.

The pixelized color filter element 10 has the total reflectance higher than 5% in the visible light (wavelength range of 400 to 700 nm) for light recycling so as to increase the light utilization rate of the display device. This reflectance can be easily higher than 10%, and it is possibly higher than 20%, or even higher than 30% or 40%, if the physical thickness and refractive index of the first and second material layers 21 (or 21a) and 22 are accurately controlled with low deviation to match the optical interference, and high transparent materials are selected as the materials for the first and second material layers 21 (or 21a) and 22. That is to say, the lower deviation in the optical thickness of the first and second material layers 21 (or 21a) and 22, the higher reflectance for the first, second and third pixelized filters 11, 12 and 13, and larger light recycling for the pixelized color filter 10.

Based on the spirit of the present invention, the optical designs for the first, second and third pixelized filters are not limited to the layer structures of $((H/2)L(H/2))_n$ and $((L'/2)H'(L'/2))_n$ disclosed here. Other designs of the optical interference filters are still within the scope of the present invention, such as using three or more materials instead of two materials and the combination of the computer simulations to finely tune the layer structures, i.e. the thickness for each layer.

The first and second material layers for the first, second and third pixelized filters can be manufactured by the ink jet printing or other precision coating or printing techniques. For example, the $SiO_2$, $TiO_2$ or other materials in the nano-particle size with the surface treatment can be separately dissolved into the solutions, which can be sequentially ink-jetted and dried to form the alternating first and second material layers.

Figure 6:
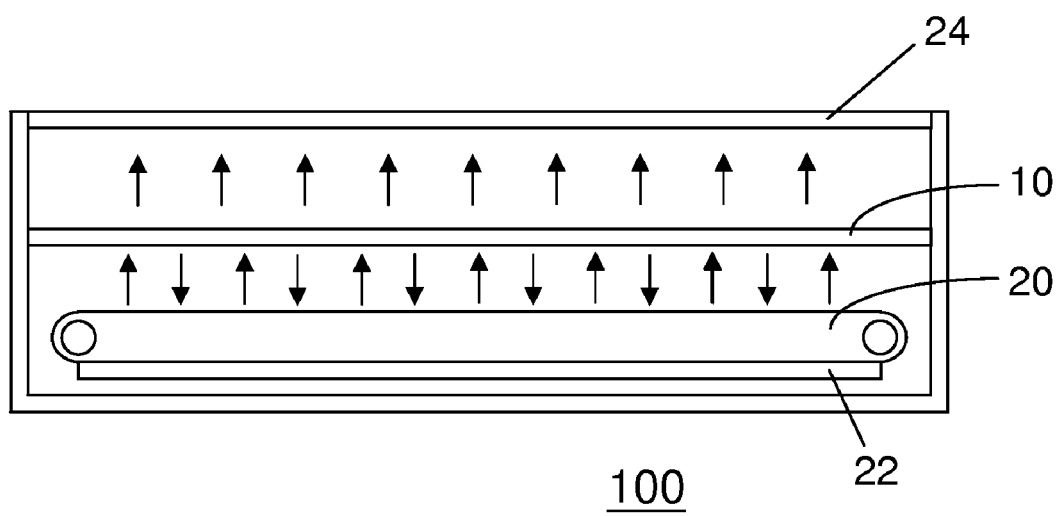
FIG. 6 is a schematic diagram showing sectional view of the display device 100 according to the first embodiment of the present invention.

Please refer to the FIG. 6, which is a schematic diagram showing sectional view of the display device 100 according to the first embodiment of the present invention. These reflected lights from the first, second and third pixelized filters 11, 12 and 13 of the pixelized color filter element 10 will go back to the back light source 20 and then will be reflected by the reflector 22 of the back light source 20 to reach the pixelized color filter element 10 again. Therefore the reflected light from the first, second and third pixelized filters 11, 12 and 13 can be recycled continuously again and again. So the light (luminance) comes out of the screen 24 will greatly increase. In this condition, we can keep the luminance unchanged by using the back light source with much less power to significantly reduce the power consumption. Theoretically this light recycling can triple light utilization rate in the perfect condition without any absorption in the polarizer and the color filter.

That is to say, the recycled lights can be reused to greatly increase the light utilization rate for the display device. On the contrary, the pigments used in the current color filters transmit the desired lights, i.e. red, green and blue lights, and absorb the complementary lights of these desired lights without reflecting and recycling the complementary lights. Therefore the light utilization rate for the current color filter is limited to one third of the white light generated from the back light source at the best condition, and in effect two third of the electric power are wasted as generating heat, which, to be worse, may further reduce the life time of the display device, e.g. LCD. The present invention can solve the above mentioned problem and can greatly increase the light utilization rate by using the present inventive pixelized color filter element 10.

Furthermore, the present inventive pixelized color filter element 10 is not limited to be used for LCD. Any display device, which necessitates the white light source and pixelized color filter element, can be benefited by the present invented pixelized color filter element 10, such as electrowetting display device, etc.

Second Embodiment

Figure 7:
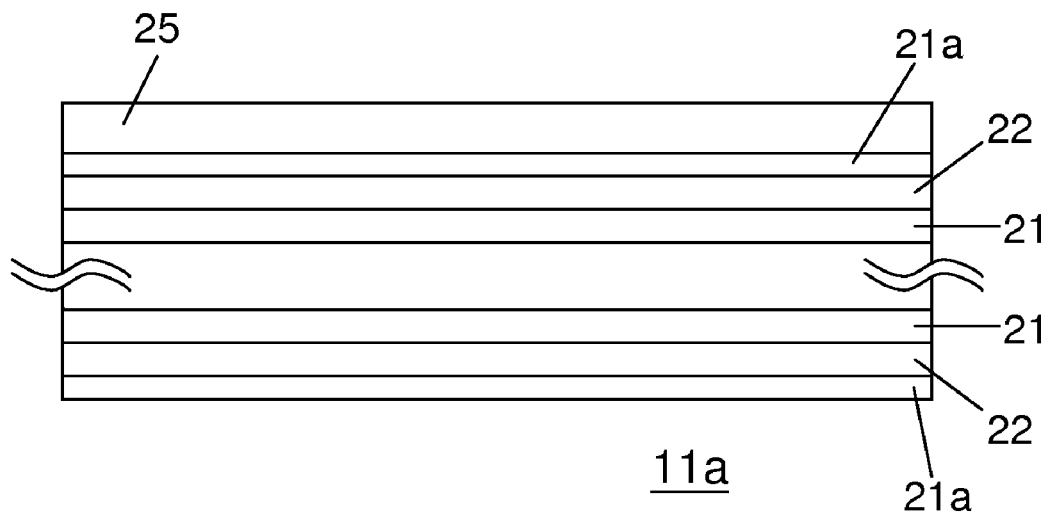
FIG. 7 is a schematic diagram showing sectional view of the first pixelized filter according to the second embodiment of the present invention.

The same layer structures of the first, second and third pixelized filters in the first embodiment are adopted and further coated with the pigments on each farthest layer of the first, second and third pixelized filters from the back light source in this embodiment. Please refer to FIG. 7, which is a schematic diagram showing sectional view of the first pixelized filter 11a according to the second embodiment of the present invention. The first pixelized filter 11a can transmit the red light and reflect the cyan light with the same function as that in the first embodiment. The farthest layer of the first pixelized filter 11a from the back light source is coated with a red pigment layer 25 in this embodiment as shown in FIG. 7.

In this embodiment, the red light can be purified further by the red pigment layer 25, after pass through the long-pass edge interference filter structure of alternating first material layers 21 (or 21a) and second material layers 22. So the red light coming out of the first pixelized filter 11a will be a pure red light with the desired chromatic coordinate. Meanwhile, the first pixelized filter 11a still can reflect and recycle the cyan light, the complementary light of the red light so as to greatly increase the light utilization rate.

By the same concept, the second and third pixelized filters can be coated with the green and blue pigment layers, respectively, to further purify the color lights and to reinforce the color performance.

Based on the spirit of the present invention, the pixelized color filter element can include more pixelized filters besides the first, second and third pixelized filters, such as the pixelized filters for yellow, cyan, and magenta color lights to magnify the displayed color domain in the chromatic coordinate and to enhance the color performance.

From the above description, the present invention provides a display device and a pixelized color filter element, which can greatly increase the light utilization rate by the design of the light recycling. Therefore the electric power consumption of the display device can be tremendously reduced with a great advantage of significant power saving.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the claims which are to be accorded with the broadest interpretation so as to encompass all such modifications and similar structures.

What is claimed is:

1. A display device comprising:
   a light source; and
   a pixelized color filter element comprising:
      a plurality of first pixelized filters;
      a plurality of second pixelized filters; and
      a plurality of third pixelized filters;
      wherein the pixelized color filter element has a total reflectance higher than 5% in a wavelength range of 400 to 700 nm, and each of the first pixelized filters, second pixelized filters and third pixelized filters is a non-polar filter and comprises:
      a first material layer made of a first isotropic material and having a total transmittance higher than 50% in a wavelength range of 400 to 700 nm; and
      a second material layer made of a second isotropic material and having a total transmittance higher than 50% in a wavelength range of 400 to 700 nm.

2. A display device as claimed in claim 1, wherein the first pixelized filters transmit a red light, the second pixelized filters transmit a green light, and the third pixelized filters transmit a blue light.

3. A display device as claimed in claim 1, wherein the first pixelized filters reflect a cyan light, the second pixelized filters reflect a magenta light, and the third pixelized filters reflect a yellow light.

4. A display device as claimed in claim 1, wherein at least one of the first pixelized filters is one of an edge interference filter and a band-pass interference filter.

5. A display device as claimed in claim 1, wherein at least one of the second pixelized filters is one of an edge interference filter and a band-pass interference filter.

6. A display device as claimed in claim 1, wherein at least one of the third pixelized filters is one of an edge interference filter and a band-pass interference filter.

7. A display device as claimed in claim 1, wherein at least one of the first pixelized filters, the second pixelized filters and the third pixelized filters further comprises:
   a plurality of first material layers, wherein at least one of the plurality of the first material layers has a total transmittance higher than 50% in a wavelength range of 400 to 700 nm; and
   a plurality of second material layers, wherein at least one of the plurality of second material layers has a total transmittance higher than 50% in a wavelength range of 400 to 700 nm;
   wherein the first and second material layers are alternately configured.

8. A display device as claimed in claim 1, wherein the pixelized color filter element is made by one of a printing method and a coating method.

9. A display device as claimed in claim 1, wherein the pixelized color filter element is made by an ink jet printing method.

10. A display device as claimed in claim 1, wherein the display device is a liquid crystal display device.

11. A pixelized color filter element for a display device comprising:
   a plurality of first pixelized filters;
   a plurality of second pixelized filters; and
   a plurality of third pixelized filters;
   wherein the pixelized color filter element has a total reflectance higher than 5% in a wavelength range of 400 to 700 nm, and each of the first pixelized filters, second pixelized filters and third pixelized filters is a non-polar filter and comprises:
   a first material layer made of a first isotropic material and having a total transmittance higher than 50% in a wavelength range of 400 to 700 nm; and
   a second material layer made of a second isotropic material and having a total transmittance higher than 50% in a wavelength range of 400 to 700 nm.

12. A pixelized color filter element as claimed in claim 11, wherein the first pixelized filters transmit a red light, the second pixelized filters transmit a green light, and the third pixelized filters transmit a blue light.

13. A pixelized color filter element as claimed in claim 11, wherein the first pixelized filters reflect a cyan light, the second pixelized filters reflect a magenta light, and the third pixelized filters reflect a yellow light.

14. A pixelized color filter element as claimed in claim 11, wherein at least one of the first pixelized filters is one of an edge interference filter and a band-pass interference filter.

15. A pixelized color filter element as claimed in claim 11, wherein at least one of the second pixelized filters is one of an edge interference filter and a band-pass interference filter.

16. A pixelized color filter element as claimed in claim 11, wherein at least one of the third pixelized filters is one of an edge interference filter and a band-pass interference filter.

17. A pixelized color filter element as claimed in claim 11, wherein at least one of the first pixelized filters, the second pixelized filters and the third pixelized filters further comprises:
   a plurality of first material layers, wherein at least one of the plurality of the first material layers has a total transmittance higher than 50% in a wavelength range of 400 to 700 nm; and
   a plurality of second material layers, wherein at least one of the plurality of second material layers has a total transmittance higher than 50% in a wavelength range of 400 to 700 mn;
   wherein the first and second material layers are alternately configured.

18. A pixelized color filter element as claimed in claim 11 being made by one of a printing method and a coating method.

19. A pixelized color filter element as claimed in claim 11 being made by an ink jet printing method.

20. A pixelized color filter element as claimed in claim 11, wherein the first and second isotropic materials are selected from a group consisting of $SiO_2$, $SiO$, $Si_2O_3$, $Al_2O_3$, $BeO$, $MgO$, $CeF_3$, $LiF$, $NaF$, $MgF_2$, $CaF_2$, $TiO_2$, $Ta_2O_5$, $ZrO_2$, $HfO_2$, $Sb_2O_3$, $Y_2O_3$, $CeO_2$, $PbCl_2$ and $ZnS$, and the first isotropic material is different from the second isotropic material.

* * * * *